(12) United States Patent
Specht

(10) Patent No.: US 6,634,491 B1
(45) Date of Patent: Oct. 21, 2003

(54) CONVEYOR CHAIN

(75) Inventor: Dieter Specht, Arcegno (CH)

(73) Assignee: Interroll Holding, AG, San Antonino (CH)

( * ) Notice: Subject to any disclaimer, the term of this patent is extended or adjusted under 35 U.S.C. 154(b) by 0 days.

(21) Appl. No.: 09/673,366

(22) PCT Filed: Apr. 7, 1999

(86) PCT No.: PCT/EP99/02357

§ 371 (c)(1),
(2), (4) Date: Dec. 4, 2000

(87) PCT Pub. No.: WO99/54239

PCT Pub. Date: Oct. 28, 1999

(30) Foreign Application Priority Data

Apr. 17, 1998 (DE) .......................................... 198 17 125

(51) Int. Cl.⁷ .............................................. B65G 17/38
(52) U.S. Cl. ...................................... 198/853; 198/852
(58) Field of Search ................................. 198/852, 853

(56) References Cited

U.S. PATENT DOCUMENTS

| | | | | |
|---|---|---|---|---|
| 1,424,850 A | * | 8/1922 | Purcell ...................... | 198/853 |
| 1,817,373 A | * | 8/1931 | Hopkins ..................... | 198/853 |
| 3,317,030 A | * | 5/1967 | Davis .......................... | 198/853 |
| 3,646,752 A | * | 3/1972 | Kampfer ..................... | 198/852 |
| 3,952,860 A | * | 4/1976 | Specht ........................ | 198/853 |
| 4,153,152 A | | 5/1979 | Lapeyre | |
| 4,664,253 A | | 5/1987 | Fahrion | |
| 5,429,227 A | | 7/1995 | Krossmann et al. | |
| 5,586,644 A | | 12/1996 | Coen et al. | |

FOREIGN PATENT DOCUMENTS

| | | |
|---|---|---|
| DE | AS1000742 | 1/1957 |
| DE | AS1207871 | 12/1965 |
| DE | OS1802401 | 11/1969 |
| DE | OS2100349 | 7/1971 |
| DE | 2822196 A1 | 11/1979 |
| DE | 3240912 | 5/1983 |
| DE | 29516872 | 4/1996 |
| EP | 0 462 336 A1 | 12/1991 |
| EP | 0569072 A1 | 11/1993 |
| FR | 1368646 | 9/1963 |
| GB | 897549 | 11/1960 |
| GB | 2088016 A | 6/1982 |
| GB | 2107020 A | 4/1983 |

* cited by examiner

*Primary Examiner*—Christopher P. Ellis
*Assistant Examiner*—Mark A. Deuble
(74) *Attorney, Agent, or Firm*—Coats & Bennett, P.L.L.C.

(57) ABSTRACT

The invention relates to a conveyor chain (1) with a plurality of main links (2) which are moveably interconnected by connecting links (4). A first end of a first main link (2) forms a first joint (6) with a first end of a connecting link (4) in the longitudinal direction of the chain. Said joint (6) allows a pivoting movement about an axis (A), essentially at a right angle to the longitudinal direction of the chain and essentially parallel to the chain surface. The second end of the connecting link (4) forms a second joint (8) with the second end of the next main link (2). The second joint allows a pivoting movement about an axis (B), perpendicular to the longitudinal direction of the chain and the pivoting axis (A) of the first joint (8). The two axes (A, B) are situated in different planes when seen in the longitudinal direction of the chain.

8 Claims, 6 Drawing Sheets

CONVEYOR CHAIN

Figure 1:
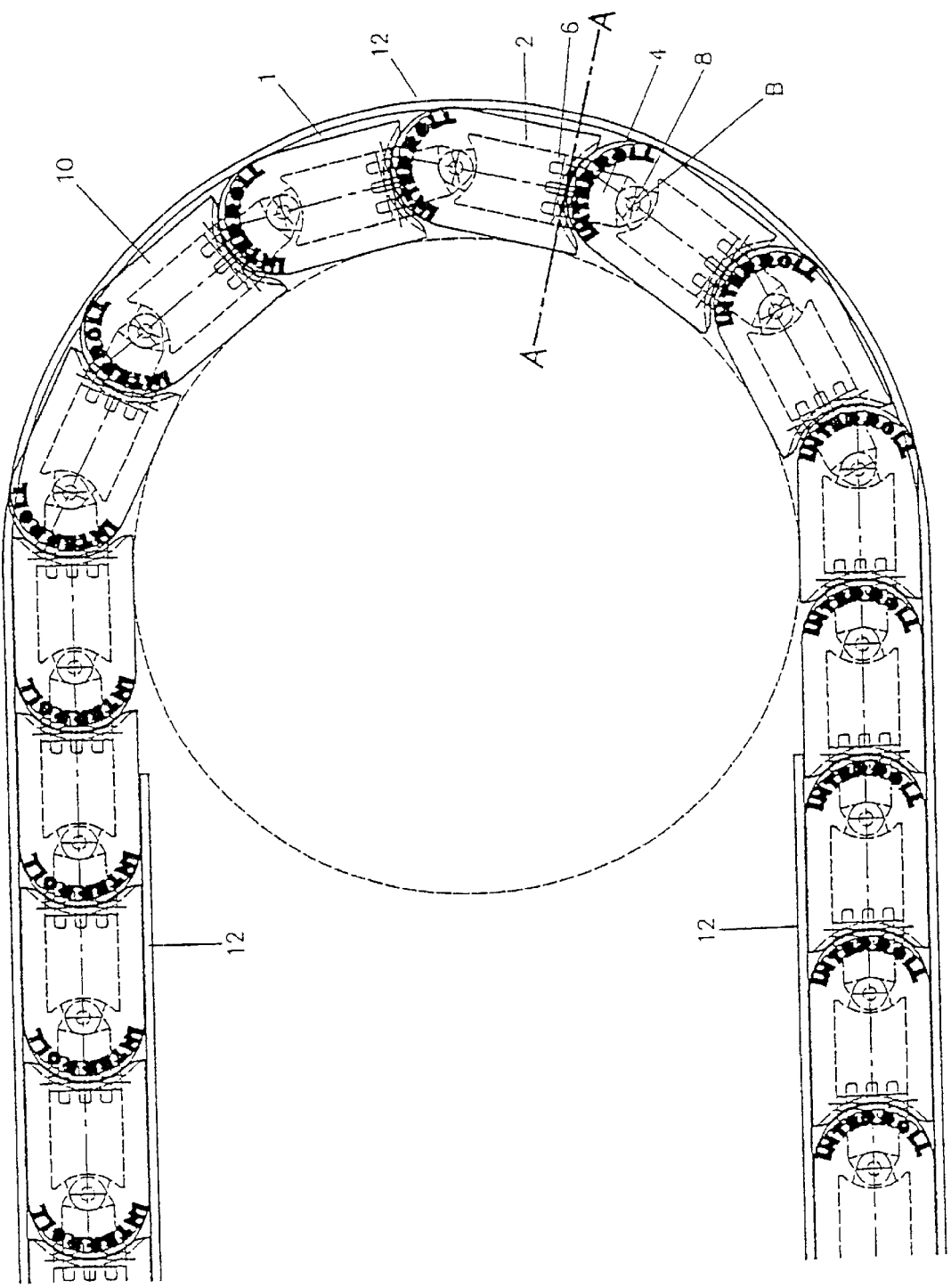

The invention pertains to a conveyor chain for the movement of objects.

Conveyor chains are known which are used in industry for the conveyance of different objects. Such conveyor chains consist of numerous chain links, which as a rule have a planar surface, on which the objects to be conveyed can be placed. Frequently, at least two conveyor chains, which are parallel to each other, are used so that larger objects can be moved, which in this case rest on both chains. The individual chain links are moveably connected with each other so that pivoting movements in two mutually vertical directions are possible. On the one hand, the chain links must be able to move on the transport plane with respect to each other, so that the course of the conveyance is also possible in curves, on the other hand it must be possible that the chain links can move vertically to the transport plane so that a return of the chain links beneath the conveyance plane is possible. In the known conveyor chains, this movement that is moveable around two axes is formed between the chain links by a type of universal joint, i.e. the two pivoting axes intersect in a point. This link connection is constructed in such a manner, that the individual chain links are connected with each other by pivoting axes, which are horizontal or parallel to the transport plane, which allow a pivoting movement vertical to the transport plane. These pivoting axes are firmly attached to a first chain link, while in the second neighboring chain link they are located in elongated holes, which permit not only a pivoting movement of the two chain links around these axes with respect to each other, but also provide the axis with an additional freedom of movement in the direction of the transport plane, which allows a pivoting movement of the chain links within the transport plane. Indeed, only a real pivoting axis exists; the pivoting movement around the second, not actually present pivoting axis is merely achieved by means of a play in the orientation of the first axis in one of the two adjacent chain links. According to this construction, only limited movement is possible in the known conveyor chains. Furthermore, dirt can easily collect in the lateral elongated holes that contain the pivoting axes, which can additionally restrict movement and thus the function of the conveyor chain. The limited movement of the known conveyor chains requires additionally a large play in the lateral guide in order to enable a course in curves.

The task of the invention is to create an improved conveyor chain that allows greater mobility.

This task is resolved by the characteristics cited in claim 1. Preferred designs can be derived from the subclaims.

The conveyor chain according to the invention includes for the two required pivoting movements two separate hinges between the individual chain links, which are connected by means of corresponding connecting links. The uncoupling of the two pivoting axes allows a greater freedom of movement of the chain links around the individual axis. In addition, the lateral elongated holes known from conventional technology, which are extremely sensitive to dirt, can be omitted, which results in an improvement of the reliability of the function of the conveyor chain. In the case of the conveyor chain according to the invention, the movement of the chain links with respect to each other is no longer limited by the construction of the links themselves, as is the case with the known conveyor chains, but merely by the eventual stops which are the result of the shape of the upper and lower surfaces of the main links.

Advantageously, the connecting links are almost completely covered at the upper and lower surfaces by at least one adjacent main link. This has the advantage, that an almost continuous, smooth surface is formed on the upper surface of the chain, which is interrupted only by a narrow gap between the individual main links. This allows a large supporting surface for the goods to be transported and the hinges between the individual chain links are protected against the effects of dirt or mechanical damage by the cover. The cover of the connecting links on the lower surface allows an almost continuous, smooth supporting surface for the conveyor chain, which improves the sliding characteristics of the chain in a guide.

Preferably, a connecting link is covered on its upper and/or lower surface up to the area of the first hinge by a main link adjacent to the second hinge. Such a design has as its effect that despite the almost complete coverage of the connecting link the movement of the two main links parallel to the chain surface is virtually not restricted. In addition, the movement between the main links vertical to the chain surface or to the transport plane is virtually not restricted, since the parting line between the upper and lower surfaces of the two adjacent main links lies in the area of the second hinge. Thus the two hinges are optimally protected, without significantly restricting the movement of the conveyor chain.

All main links and all connecting links preferably have the same design. This allows a cost-effective construction of the conveyor chain, since it consists only of two different components, the main links and the connecting links.

Preferably, the main links contain recesses on their lower surface, in which the chain wheel can engage. These recesses on the lower surface can be designed, independent of the remaining design of the conveyor chain, in such a manner that an especially favorable contact between the chain wheel and the main links is achieved. This results in reliable and secure propulsion of the conveyor chain, over which large forces can also be transmitted reliably, so that heavy goods can also be transported on the conveyor chain.

Preferably, the main links also include lateral guide grooves, which run in the direction of the longitudinal direction of the chain. These guide grooves allow a secure movement of the conveyor chain in a corresponding conveyance profile. Advantageously, the guide grooves are designed in such a manner that the upper surface of the conveyance profile is covered by the upper flanks of the guide groove, especially also in curves. This prevents, that dirt or also parts of the goods being conveyed can attach to or be caught between the conveyor chain and the conveyance profile. Thus, together with the conveyance profile, the conveyor chain constitutes a smooth, almost closed surface, which prevents the penetration of foreign bodies in the conveyance trajectory and thus potential functional disturbances. Furthermore, the formation of such a groove may also have as effect, that the main links rest both with the upper flank of the guide groove as well as with their lower surface on the conveyance profile, which may result in an enhanced supporting capacity.

Preferably, at least one of the two hinges consists of several comb-like protrusions on the main link and corresponding comb-like protrusions on the connecting link, which mesh in the spaces of the protrusions on the main link, whereby a traversing hinge bolt passes through the protrusions of the main and connecting link. This design of the hinges ensures that the hinge bolt receives multiple support on the connecting link as well as on the main link, which ensures the reliable transmission also of larger forces. Furthermore, the force transmission is extremely uniform because of the multiple support of the hinge bolt.

The hinge bolts are preferably retained in the hinges by means of catch connections. This allows a simple mounting of the conveyor chain, since the hinge bolts merely must be inserted in the corresponding openings of the hinges and then lock in them. Thus, no additional attachment elements and attachment processes are required.

Preferably the hinge bolt is made of synthetic material. This will preclude corrosion of the hinge bolt, which would impede the movement of the hinge. Also, a hinge bolt, especially a hinge bolt with catch connections, can be manufactured very cost effectively and easily from synthetic material.

Preferably, the main links and/or the connecting links are manufactured in one piece, preferably from synthetic material. The single-piece design of the individual links reduces the number of required mounting activities and therefore allows a faster and more cost effective mounting of the conveyor chain. In addition, the reduced number of parts limits the number of potential failures and thus enhances the reliability of the conveyor chain. The main and the connecting links can easily and cost effectively be manufactured from synthetic material and additionally, the use of synthetic material precludes corrosion of the conveyor chain which may affect its function.

Figure 2:
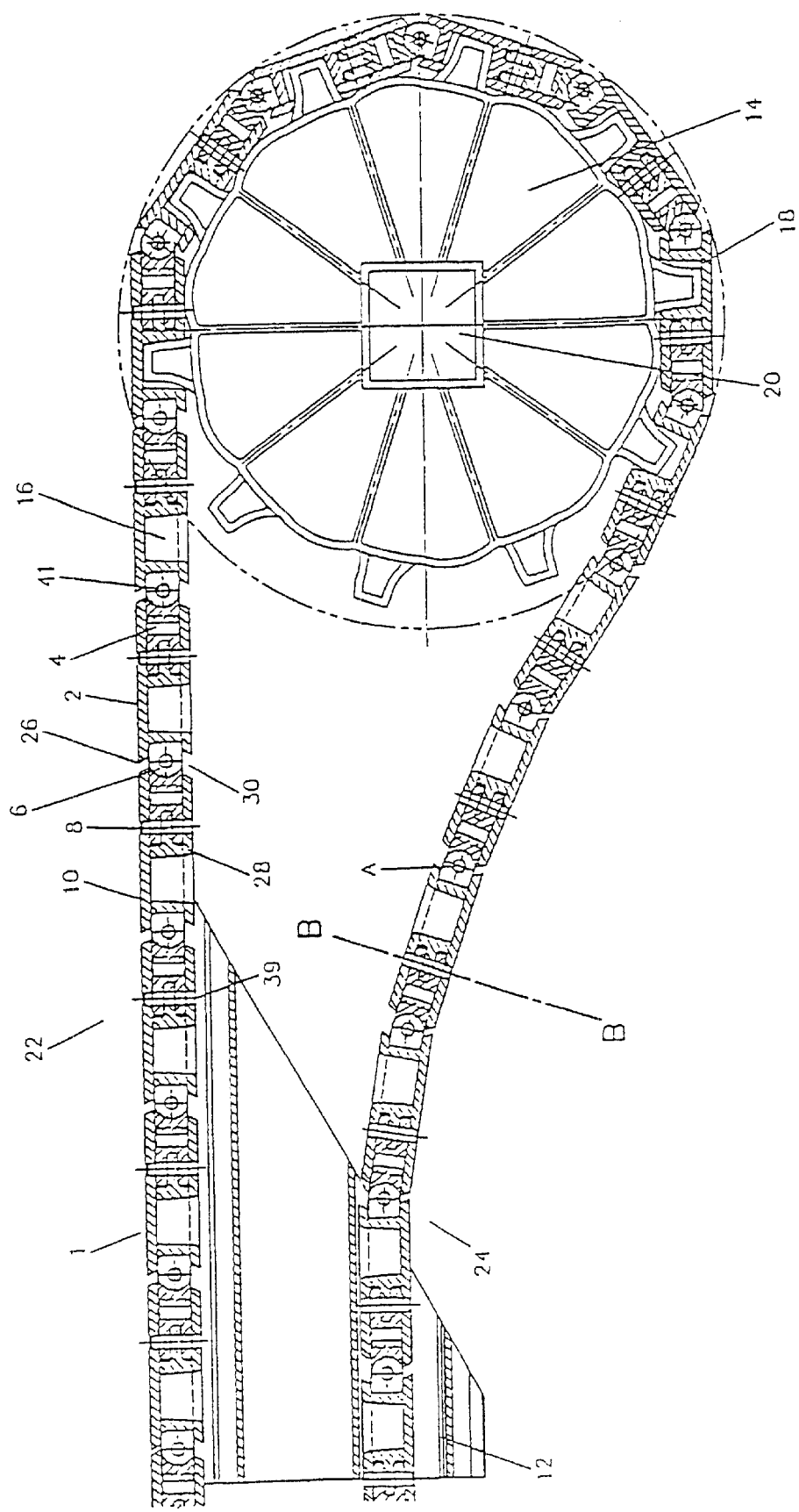
Figure 4:
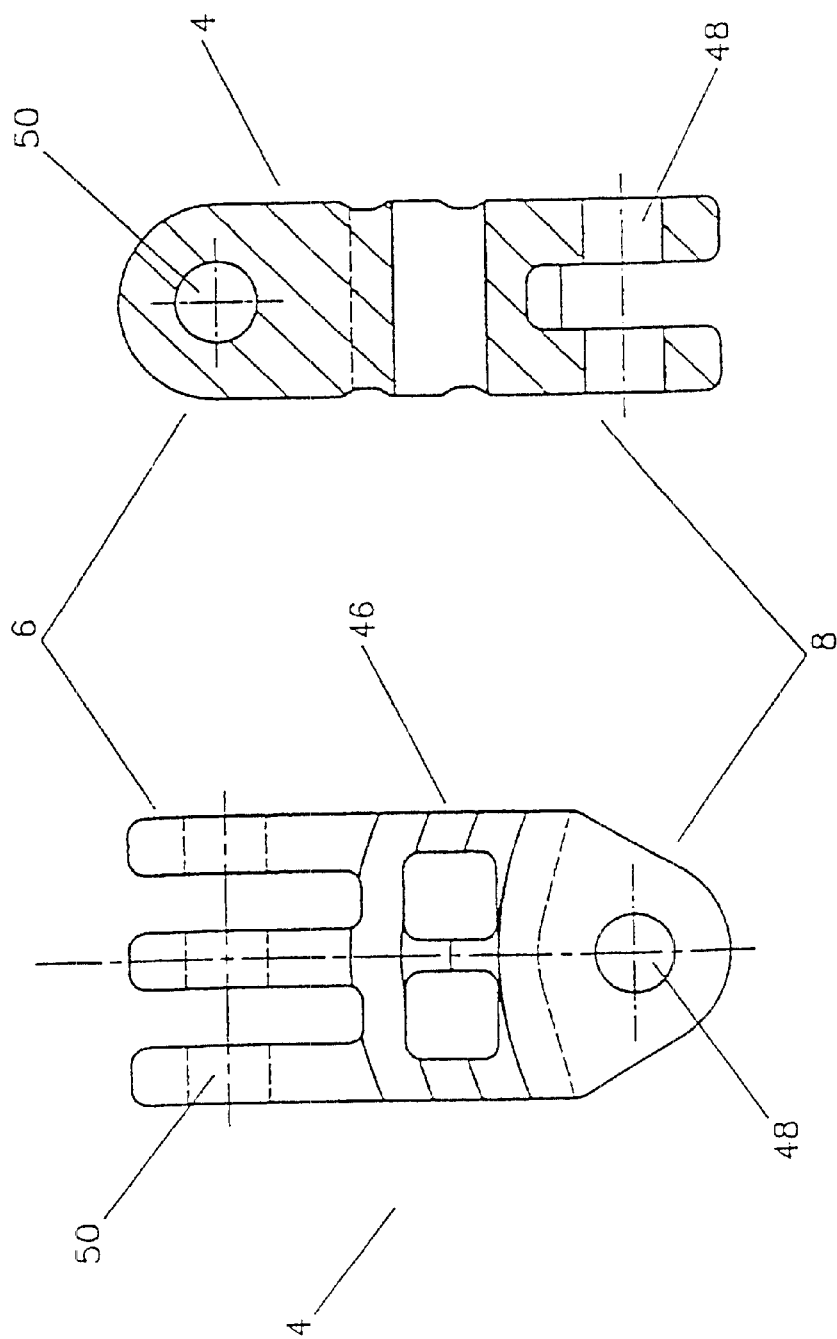

The invention is described below with reference to the attached drawings. The drawings show:

FIG. 1: A plan view of the conveyor chain,

FIG. 2: A cut lateral view of the conveyor chain,

FIG. 3(a)–(e): The main link in various views,

FIG. 4: The connecting link in various views, and

Figure 5:
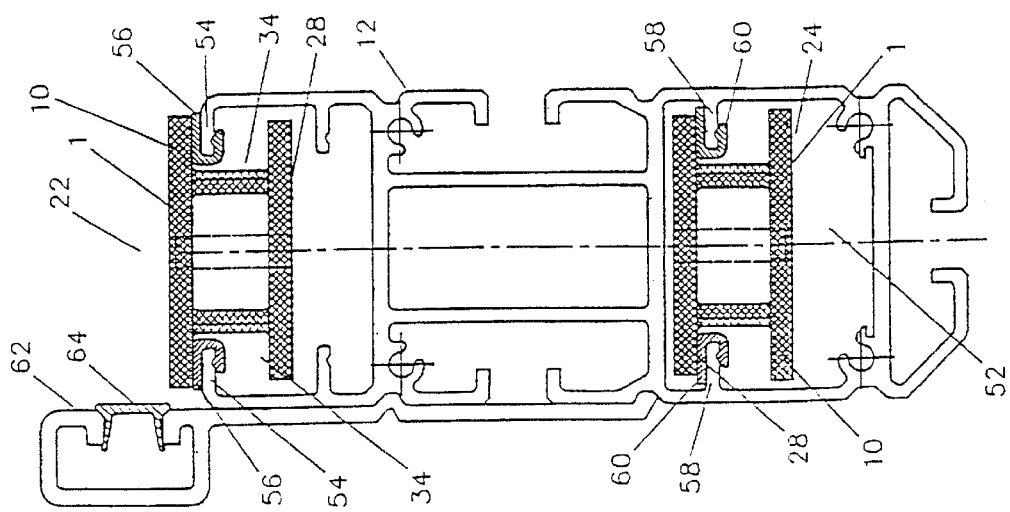

FIG. 5: A cross-section of the chain supporting profile using the conveyor chain according to the invention, FIG. 6: A cross-section of the chain supporting profile using a conveyor belt, FIG. 7: A cross-section of the chain supporting profile using a roller chain, FIG. 8(a)+(b): Various views of a roller chain.

FIG. 1 shows a plan view of conveyor chain 1, according to the invention. This drawing only shows a conveyor chain 1, which is turned around in a U-shape. However, in preferred arrangement, two or more conveyor chains 1 can run parallel to each other, so that larger objects can be transported. Conveyor chain 1 consists of multiple main links 2, which are connected by connecting links 4, depicted by dotted lines. The connection is designed in such a manner that connecting links 4 are largely covered by the main links 2. The connection between the main links 2 and the connecting links 4 is made moveably by a first hinge 6 and a second hinge 8, whereby the pivoting axes A, B of the two hinges 6, 8 essentially are perpendicular to each other. Pivoting axis A of hinge 6 essentially runs vertical to the longitudinal direction of the chain and parallel to the surface of conveyor chain 1, so that a bending movement between chain links 2, 4 in the longitudinal direction of the chain vertical to the chain surface becomes possible. Pivoting axis B of hinge 8 essentially runs vertical to the surface of conveyor chain 1 and allows a pivoting movement of the chain in the conveyance plane.

With respect to their upper surface, main links 2 are designed in the form of a covering plate 10, which largely covers hinges 6, 8 and connecting links 4. This results in an almost continuous, smooth surface of conveyor chain 1, which contains few gaps in which dirt can penetrate. Thus, hinges 6, 8 are arranged in a protected manner, so that their high mobility is also ensured on the long term. FIG. 1 also shows the chain supporting profile 12, which carries and guides conveyor chain 1. This plan view shows that conveyor chain 1 according to the invention can traverse very narrow curve radii, especially hinge 8 offers great freedom of movement, which is less limited by hinge 8 itself rather than the colliding of the parts of main links 2.

FIG. 2 shows a cut lateral view of conveyor chain 1 according to the invention. Specifically the guide and the drive of conveyor chain 1 is shown. Conveyor chain 1 is guided in a chain carrier profile 12 and deflected over a chain wheel 14 and simultaneously driven by it. To this effect, main links 2 are provided on the underside with recesses 16, in which teeth 18 of chain wheel 14 can mesh. Chain wheel 14 can be fastened to a shaft by means of a hub 20, which here possesses an essentially square cross-section, so that it can be driven by it. In forward pass 22 the conveyor chain is guided on the upper side of carrier profile 12 and next deflected over chain wheel 14. Return pass 24 of the conveyor chain 1 is parallel to the forward pass 22 of conveyor chain 1, underneath forward pass 22 inside chain carrier profile 12. Conveyor chain 1 is protected against damage and dirt contamination because of the fact that the reverse movement takes place inside chain carrier profile 12. Furthermore, the number of exposed, moving parts is reduced, which minimizes the danger of injury to persons active near conveyor chain 1. FIG. 2 also shows that hinges 6 permit movement of main links 2 in two directions to one another. Thus, conveyor chain 1 can be bent in two directions with a pivoting movement around hinges 6. First, conveyor chain 1 is bent downward over chain wheel 14, and after contacting chain wheel 14 it is bent in the opposite direction. This permits that despite a large chain wheel 14, which allows a favorable transfer of force, forward pass 22 and return pass 24 of conveyor chain 1 can take place in a common chain carrier profile, very close to each other. This results in a highly compact and space-saving arrangement of conveyor chain 1. The upper surfaces of main links 2 are designed as covering plates 10, which constitute an almost continuous surface of conveyor chain 1. The very narrow gap 26 between the individual main links 2 on the upper surface are advantageously designed obliquely, so that hinges 6, 8 are almost completely covered by covering plates 10 of main links 2. Although the narrow gaps 26 restrict the freedom of movement of hinges 6 in a vertical direction, i.e. in a direction vertical to the transport plane, nevertheless only a limited freedom of movement is required in this vertical pivot direction, because this mobility is only required for return pass 24, where as has been shown a large curvature radius is possible. In addition, a limited freedom of movement in this direction is required in the event that conveyor chain 1 must overcome gradients. The lower surfaces of main links 2 are also designed in the form of covering plates 28 which contain mesh openings 16 for teeth 18 of chain wheel 14 as well as a larger gap 30 between the individual main links 2, which permit a greater mobility of hinges 6 in a downward swivel movement. This allows that a chain wheel 14, which is used as a drive or deflection wheel, can be designed with a smaller radius. The larger gaps 30 at the lower surface of conveyor chain are less interfering because they run protected inside chain carrier profile 12 so that the danger of the penetration of dirt is limited. Connecting links 4 essentially lie completely between covering plates 10 and 28 on the upper and lower surface of main links 2. Other than their position protected against dirt or mechanical damage, this also provides a larger supporting plane between the main links and the connecting links, which results in a high carrying capacity of conveyor chain 1.

Figure 3:
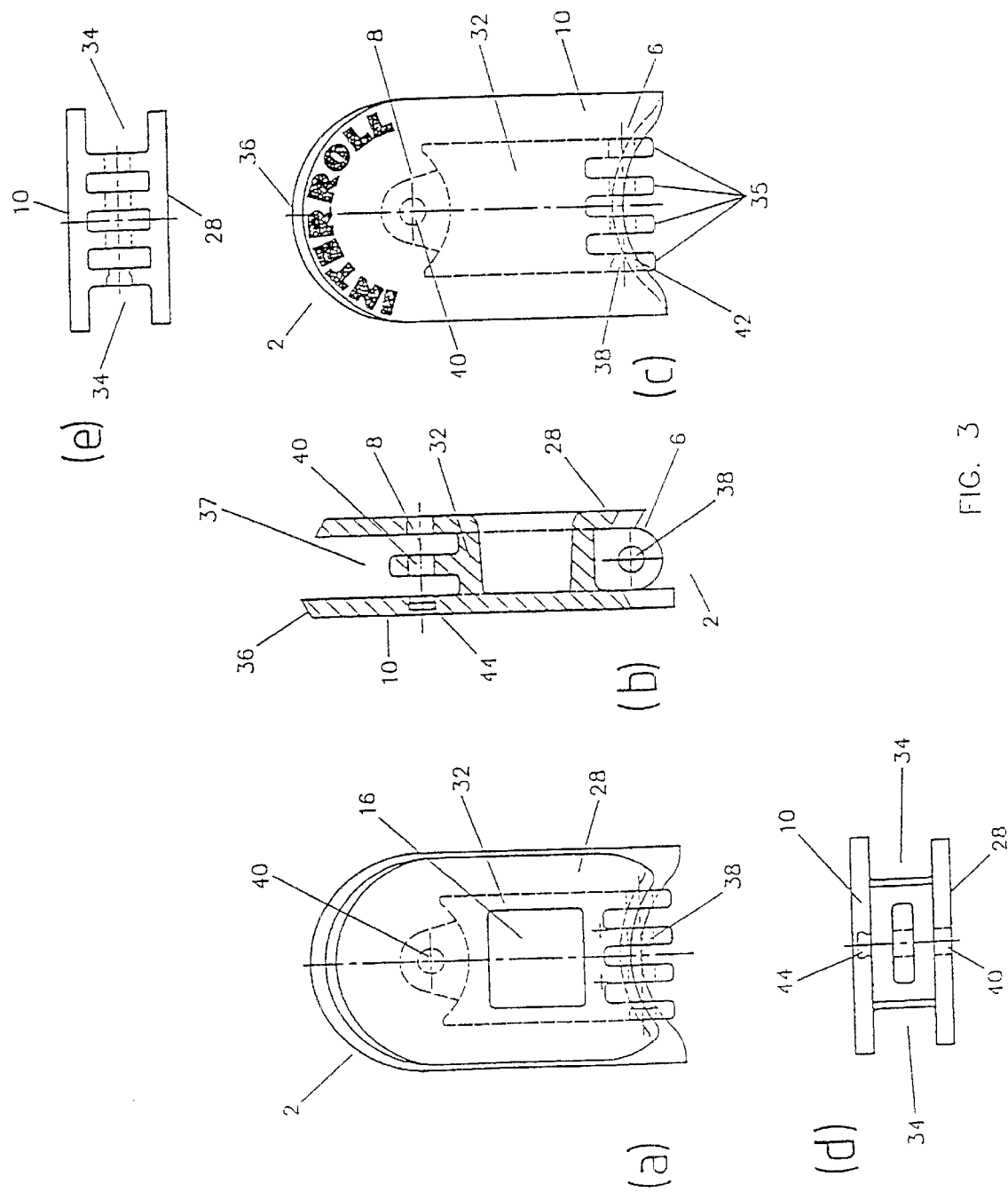

FIG. 3 shows a main link 2 in various views. A plan view of main part 2 is depicted on the right in FIG. 3. Main part 2 is almost completely covered by covering plate 10. Thus, it forms a large carrying surface, on which the loads to be conveyed are securely positioned. Center piece 32 of main link 2, represented by a dotted line, is almost completely covered by covering plate 10 and is offset backward with respect to the lateral edges of covering plate 10, which results in the lateral guide grooves 34, in which chain carrier profile 12 can engage. The parts on the side of the main link of hinges 6 and 8 are formed on center piece 32. The plan view shows that hinge 6 consists of multiple comb-like protrusions 35, in the intermediate gaps of which the corresponding comb-like opposite parts of connecting link 4 can engage. Thus, a high carrier capacity and even force distribution is ensured by hinge 6. With respect to the facing edge 36 of main link 6, hinge 8 is recessed inwards, which allows that connecting link 4 is almost completely covered by covering plate 10 when conveyor chain 1 is fully assembled. The side view of main link 2 shows that hinge 8 is also comb-shaped, so that a high carrying capacity and even force distribution is also ensured with this hinge 8. In the direction of the front edge of main link 2, lower covering plate 28 protrudes over hinge 8, so that together with the upper covering plate 10 a receiving space 37 is created for connecting link 4. Boreholes 30 and 40, through which hinge bolts 39, 41 can be inserted, are provided in the comb-shaped protrusions of the parts of hinges 6 and 8 at the side of the main links. Borehole 40 of hinge 8 is not complete, but rather is covered at its upper surface by covering plate 10, which prevents the penetration of dirt into the hinge from the upper surface of the chain. In addition, hinge boreholes 38 and 40 also include catch devices 42 and 44, in which hinge bolts 39, 41 can be inserted. This permits a simple mounting, since hinges 6, 8 do not have to be screwed together and hinges 6, 8 can be mounted merely by insertion. The left side of FIG. 3 shows a plan view of the lower surface of a main link 2. The center part 32 of main link 2 is virtually completely covered by lower covering plate 28. As was the case with upper covering plate 10, lower covering plate 28 protrudes laterally over centerpiece 32, so that the earlier described guide groove 34 is formed together with the upper covering plate 10. A mesh opening 16, in which a tooth 18 of a chain wheel 14 can engage is located approximately in the middle of center piece 32. Especially in the longitudinal direction, lower covering plate 28 has a smaller extension than covering plate 10, which provides a greater mobility when the conveyor chain 1 is bent downward around pivoting axis A.

FIG. 4 shows various views of connecting link 4. At its two longitudinal ends, connecting link 4 contains the parts of hinges 6 and 8 of the side of the connecting link. These parts are also comb-shaped so that they can engage in the corresponding intermediate spaces of the parts of hinges 6, 8 on the side of the main links. Hinge boreholes 48 and 50 are provided through these two hinge parts, through which hinge bolts 39, 41, which pass through hinge boreholes 38 and 40 of main link 2, also pass when hinges 6, 8 are assembled. Centerpiece 46 of connecting link 4 presents recesses that are merely provided to save material and subsequently reduce weight. The two longitudinal ends of connecting link 4 are rounded according to the pivoting direction of hinges 6, 8, so that a greater freedom of movement is available. Advantageously, connecting link 4 has a narrower width than center piece 32 of main link 2, which has as result that for conveyor chain 1, the guide is essentially provided in guide grooves by the smooth lateral edges of center piece 32 of main link 2.

The cross-section depicted in FIG. 5 shows a chain carrying profile 12 with the conveyor chain 1 according to the invention. On its upper surface, chain carrying profile 12 guides conveyor chain 1 in forward pass 22. In the lower area of the chain carrying profile, conveyor chain 1 is guided in its return pass in a closed cavity 52. For guiding the forward pass 22 of conveyor chain 1, the chain carrying profile 12 engages with the corresponding protrusions 54 in the guide grooves 34 of main links 2 of conveyor chain 1. Protrusions 54 are equipped with slide rails 56, which allow a possible easy sliding of conveyor chain 1 on chain carrying profile 12. These slide rails 56 are advantageously made of a synthetic material possessing excellent sliding characteristics. For example, this can be a polyamide. Additional protrusions 58 are provided in the chain carrying profile in the cavity 52 for the return pass of conveyor chain 1. Similar to the protrusions 54 on the upper surface of the chain carrying profile 12, these protrusions 58 also include slide rails 60. Advantageously, these slide rails 60 are constructed identically to slide rails 56, which are used on the upper surface of chain carrying profile 12. This permits a reduction of the number of parts. Protrusions 58 with slide rails 60 also engage in guide grooves 34 of the main links 2 of conveyor chain 1. However, in the return pass main links 2 of conveyor chain 1 rest on slide rails 60 with their lower covering plates 28, whereas in the forward pass 22 conveyor chain 1 is carried by the upper covering plates 10 of main links 2. Covering plate 10 protrudes over the protrusions 54 of chain carrying profile 12, so that chain carrying profile 12 is covered in an upward direction by covering plate 10, so that the penetration of dirt inside the chain carrying profile and especially into the hinges of conveyor chain 1 is prevented. Preferably, covering plates 10 protrude over protrusions 54 in such a way, that complete coverage of the resulting gap is also ensured in a curve. In addition, a guide rail 62 has been included in the carrying profile 12 depicted here. This guide rail 62 essentially forms a right angle with the surface of conveyor chain 1 and runs parallel to the longitudinal direction of the chain along the transport path. A slide body 64 is inserted in this guide rail 62, which ensures a lateral guide of an object to be transported on conveyor chain 1.

Chain carrying profile 12 depicted here is advantageously designed in such a manner that the use of this chain carrying profile 12 is not limited to the conveyor chain 1 according to the invention, but rather also allows the use of a conveyor belt or a roller chain.

Figure 6:
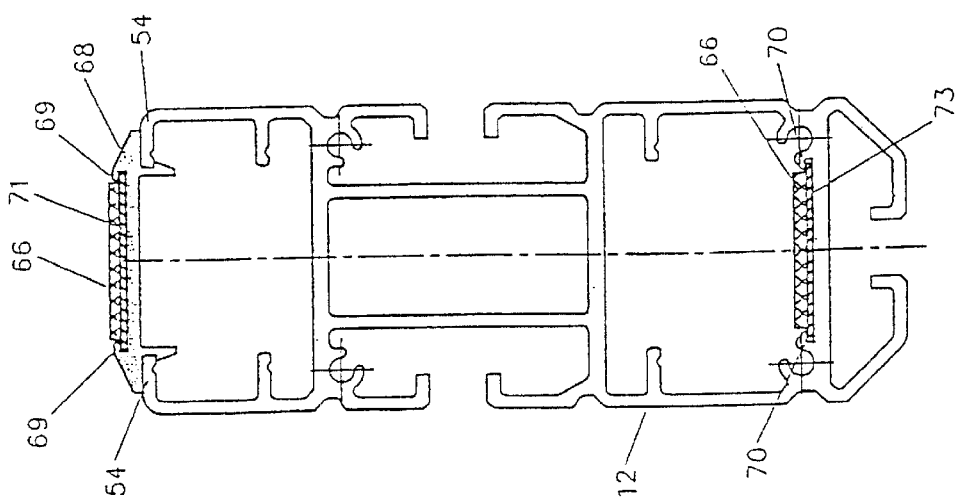

FIG. 6 shows the use of chain carrying profile 12 in connection with a conveyor belt 66. Here a carrying body 68 is used between protrusions 54, on which otherwise slide rails 56 are mounted for the guiding of conveyor chain 1. The carrying body 68 is preferably made of synthetic material or aluminum and is designed in such a manner that the body can be clipped with latch connections into the intermediate space between protrusions 54. Guide body 68 includes a corresponding guide profile 69, which guides transport belt 66. Guide profile 69 consists of two opposing profile strips, which run, in the longitudinal direction of chain carrying profile 12, which forms a T-shaped space in the cross-section. In the lower area, a sliding foil 71 is inserted in the longitudinal direction into the guiding profile 69 in such a manner, that it is enclosed in its marginal area by guiding profile 69 or the two profile strips. Thus, the gliding film lies within the area of the transverse leg of the T-shaped cross-section of guiding profile 69 and extends in the longitudinal direction of chain carrying profile 12 onto carrying body 68.

Sliding foil 71 is made of a very easily sliding synthetic material, such as for example low-pressure polyethylene, and forms a very easily sliding surface, on which conveyor belt 66 runs. Previously, in order to create a highly sliding running surface for a conveyor belt, the entire carrier body 68 together with the corresponding belt guides was cut from a correspondingly highly sliding synthetic material, because of the fact that such synthetic materials, such as for example low-pressure polyethylene, are not easily processed by means of extrusion. By comparison, the new arrangement has the advantage, that cost-intensive machining can be omitted, due to the fact that carrier body 68 together with the incorporated guide profile 69 can be produced, for example, from an easily extruded synthetic material or aluminum extrusion. It merely suffices to insert sliding foil 71 into the guide profile 69 so that an extremely smooth gliding surface is formed for conveyor belt 66. Above sliding foil 71 guiding profile 69 possesses edges, which essentially are arranged vertically to sliding foil 71 in the longitudinal direction of chain supporting profile 12 and are used as the lateral delimitation of the running plane of transport belt 66. A guide for conveyor belt 66 is formed in this manner. In addition, chain support surface 12 includes in the closed space 52 for the return pass of the conveyor belt 66 also a corresponding guide profile 70, which guides conveyor belt 66 in its return pass. Guide profile 70 is essentially designed identically to guide profile 69. However, it is not arranged on a separate supporting body, but rather directly on the bottom area of cavity 52. Thus, guide profile 70 is directly formed in the chain carrying profile 12, which has been produced by extrusion. Similar to guide profile 69, guide profile 70 also includes a sliding foil 73 arranged in an identical manner. Advantageously, sliding foil 73 has identical dimensions to sliding foil 71 so that the number of different parts can be reduced to a minimum.

Figure 7:
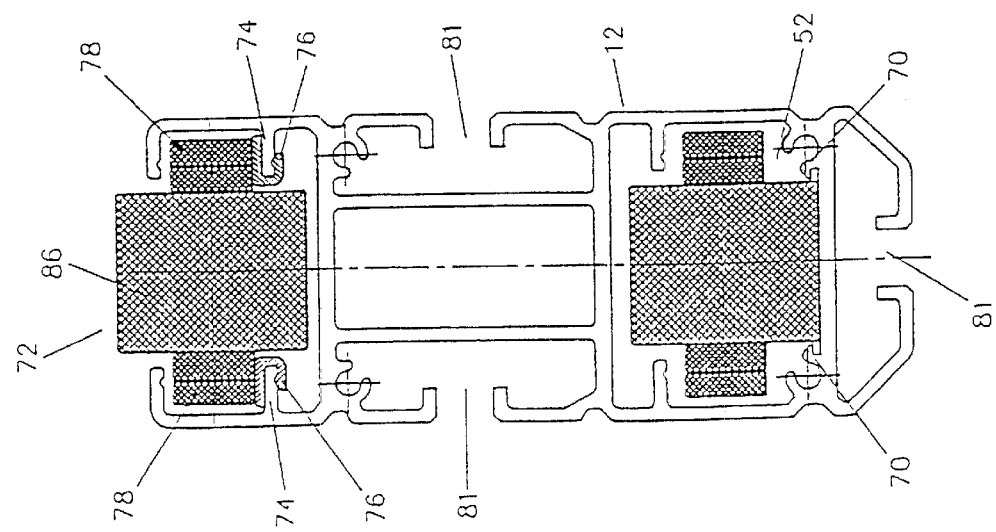

FIG. 7 shows the use of chain carrying profile 12 together with a roller chain 72. Here, chain carrying profile 12 presents on its lower surface beneath protrusions 54 an additional set of protrusions 74, on which the roller chain together with its carrying links is guided. Gliding rails 76 are attached to protrusions 74; these rails preferably have the same shape as gliding rails 56 and 58 used with the conveyor chain 1, so that the required number of parts can be further reduced. The return pass of roller chain 72 also takes place in cavity 52 on the lower surface of chain carrying profile 12, whereby in this case roller bodies 86 roll on the enclosed bottom surface of cavity 52. Here, the roller chain 72 is guided by its lateral carrying bodies 78 in connection with the sidewalls of the chain-carrying profile 12. An additional guide for roller body 86 is provided by guiding profile 70 provided in the bottom surface of cavity 52 for carrying belt 66.

In addition, chain-carrying profile 12 includes, on its sides as well as its lower surface, attachment profiles or grooves 81. These attachment grooves 81 enclose a T-shaped cavity, in which the corresponding attachment screws or nuts can be placed. For example, guiding link 62 can be fastened in these attachment grooves 81. In addition, these attachment grooves 81 can be used to attach chain-carrying profile 12 to the pertinent supports or carriers. The continuous guide grooves 82 which extend along the longitudinal direction of chain carrying profile 12 also offer a variable attachment possibility for various attachment parts, such as for example different sensors or handling devices. In addition attachment grooves 81 can also be used as a cable guide 25 along the transport path.

Figure 8:
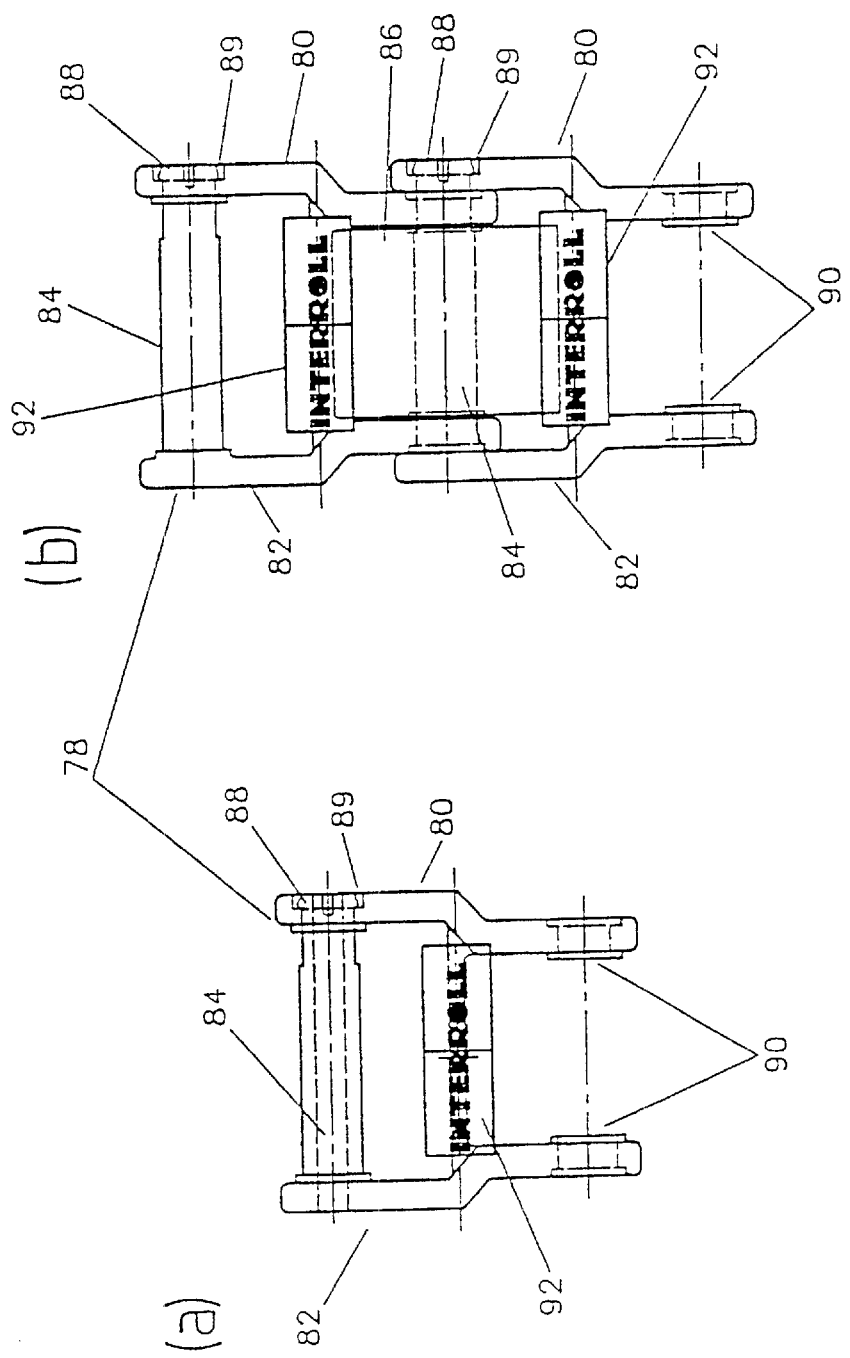

FIG. 8 provides a detailed representation of the roller chain 72 shown in FIG. 7. Roller chain 72 consists of multiple similar carrying links 78. Carrying links 78 each consist of two lateral parts 80, 82 extending in the longitudinal direction of the chain, whereby a roller axis 84, which supports a roller body 86, extends between them essentially at a right angle to the longitudinal direction of the chain and to side parts 80, 82. Roller axis 84 is made of one single piece together with side part 82, and at its free end, which is turned to side part 80, it includes latch hooks 88, which can hook into the appropriately shaped recess 89 in side part 80. Side parts 80, 82 or carrying links 78 are shaped in such a manner that they taper toward the end turned to roller axis 84 when viewed in the longitudinal direction of the chain, i.e. the distance separating chain side parts 80, 82 decreases in the direction transversely to the longitudinal direction of the chain. At this tapered end of carrying link 78, side parts 80, 82 present a through hole 90. These two through holes lie opposite each other so that roller axis 84 of the next carrying link 78 can pass through them. The dimensions of roller bodies 86 are such that at the tapered end of carrying link 78 they fit between the two side parts 80, 82, which in turn fit between side parts 80, 82 of the next carrying link 78, so that its roller axis extends through side parts 80, 82 and roller bodies 86 of the preceding carrying link 78.

In addition, connecting studs 92 are placed between side parts 80, 82, which cover the intermediate spaces between the individual rollers. The connecting studs 92 are distributed, whereby approximately half of each connecting stud constitutes an integral part of lateral part 80, 82. Centering pins or also additional latching means and corresponding recesses for the connection of the two halves are placed at the connection site of the two halves of connecting stud 92.

Thus, the entire roller chain 72 merely consists of three different individual parts, lateral sides 80, 82 and roller bodies 86, so that the number of parts compared to conventional roller chains is considerably reduced, which also implies a reduction of the manufacturing, warehousing and mounting costs. Advantageously, all parts of the roller chain 72 re made of synthetic material. On the one hand, this allows a cost-effective production, for example through die-casting, and on the other hand this offers a lightweight, easily handled and corrosion-free roller chain 72.

The mounting of roller chain 72 is extremely simple and rapid by clipping the latch elements 88, without requiring special tools.

I claim:
1. A conveyor chain comprising:
    a. a plurality of main links each said main link made of one piece and having an upper carrying surface adapted to transport a load and a lower covering plate;
    b. a plurality of connecting links interconnecting said main links to form said conveyor chain, each said connecting link being made of one piece, said connecting links having a first end connecting to a first end of an adjacent main link to form a first hinge which allows pivoting movement around a first axis at essentially a right angle to the longitudinal direction of said conveyor chain, and a second end connecting to a second end of an adjacent main link to form a second hinge which allows pivotal movement around a second axis essentially perpendicular to said first axis; and
    C. wherein said connecting links are substantially covered on an upper surface and a lower surface by at least one of the adjacent main links.
2. The conveyor chain of claim 1, in which said connecting links are substantially covered up to the area of the first hinge by the main link that is adjacent to the second binge.
3. The conveyor chain according to claim 1, in which an main links are identically shaped and all the connecting links are identically shaped.

4. The conveyor chain according to claim 1, in which the main links include recesses on their lower surfaces for engagement with a chain wheel.

5. The conveyor chain according to claim 1, in which the main links include guide grooves running in the longitudinal direction of the chain.

6. The conveyor chain according to claim 1, in which at least one said first and second hinges possesses one or more comb-shaped protrusions on the connecting link which latch into the intermediate spaces of the protrusions on the main link, whereby a continuous hinge bolt passes through the protrusions of the main link and the connecting link.

7. The conveyor chain according to claim 6, in which the hinge bolts are maintained in the hinges by means of latch connections.

8. The conveyor chain according to claim 6, in which the hinge bolts are made of synthetic material.

* * * * *